United States Patent
Yano et al.

(10) Patent No.: US 8,713,922 B2
(45) Date of Patent: May 6, 2014

(54) ENGINE EXHAUST PURIFICATION DEVICE

(75) Inventors: Masakazu Yano, Ageo (JP); Nobuhiko Masaki, Ageo (JP); Kiminobu Hirata, Ageo (JP)

(73) Assignee: UD Trucks Corporation, Ageo-shi (JP)

(*) Notice: Subject to any disclaimer, the term of this patent is extended or adjusted under 35 U.S.C. 154(b) by 0 days.

(21) Appl. No.: 13/444,240

(22) Filed: Apr. 11, 2012

(65) Prior Publication Data

US 2012/0222411 A1    Sep. 6, 2012

Related U.S. Application Data

(63) Continuation of application No. PCT/JP2009/067728, filed on Oct. 13, 2009.

(51) Int. Cl.
*F01N 3/10* (2006.01)

(52) U.S. Cl.
USPC ............................................... 60/301

(58) Field of Classification Search
USPC .................................................. 60/301, 297
See application file for complete search history.

(56) References Cited

U.S. PATENT DOCUMENTS

| | | | |
|---|---|---|---|
| 6,713,031 B2* | 3/2004 | Harris et al. | 423/239.1 |
| 7,311,749 B2* | 12/2007 | Bardon et al. | 55/523 |
| 7,431,895 B2* | 10/2008 | Pfeifer et al. | 422/177 |
| 2006/0233689 A1 | 10/2006 | Hirata et al. | |
| 2007/0048204 A1* | 3/2007 | Mital | 423/239.1 |
| 2007/0110650 A1 | 5/2007 | Pfeifer et al. | |
| 2008/0250776 A1* | 10/2008 | Brown et al. | 60/299 |
| 2010/0122527 A1 | 5/2010 | Fukuda et al. | |

FOREIGN PATENT DOCUMENTS

| | | |
|---|---|---|
| JP | 2004-60494 A | 2/2004 |
| JP | 2004-251245 A | 9/2004 |
| JP | 2005-105970 A | 4/2005 |
| JP | 2006-183507 A | 7/2006 |
| JP | 2007-501107 A | 1/2007 |
| JP | 2007-247652 A | 9/2007 |
| JP | 2007247652 A * | 9/2007 |
| JP | 2009-36084 A | 2/2009 |

OTHER PUBLICATIONS

English translation of JP 2007-247652A.*
Chinese Office Action of Chinese Application No. 200980161917.7, Aug. 27, 2013, 15 pages.

* cited by examiner

*Primary Examiner* — Thomas Denion
*Assistant Examiner* — Jason Shanske
(74) *Attorney, Agent, or Firm* — Foley & Lardner LLP

(57) ABSTRACT

In an exhaust filter, a urea hydrolysis catalyst is supported on a first portion of an inner wall of a cell passage on the inlet side, and a first NOx reducing catalyst is supported on a second portion of the inner wall of the inlet-side passage downstream of the first portion. A second NOx reducing catalyst is supported on a third portion of an inner wall of a cell passage on the outlet side where the third portion overlaps with the first portion in a direction of intersection with the exhaust flow into the exhaust filter or is downstream of the first portion. An oxidation catalyst is supported on a fourth portion of the inner wall of the outlet-side passage downstream of the third portion where the fourth portion overlaps with the second portion in the direction of intersection or is downstream of the second portion.

5 Claims, 5 Drawing Sheets

A—A

A—A

ENGINE EXHAUST PURIFICATION DEVICE

This application is a continuation of PCT/JP2009/067728, filed on Oct. 13, 2009.

BACKGROUND OF THE INVENTION

1. Technical Field

The present invention relates to an engine exhaust purification device, and specifically relates to a technique for suppressing emission of nitrogen oxides (hereafter referred to as "NOx") and particulates into the atmosphere by a compact structure.

2. Related Art

As a device for purifying engine exhaust by aftertreatment, a selective catalytic reduction (SCR) exhaust purification device that reduces NOx in exhaust by ammonia is known. In this exhaust purification device, a NOx reducing catalyst is placed in an exhaust passage, and a urea water supply device is placed upstream of the NOx reducing catalyst whereas an oxidation catalyst for ammonia purification is placed downstream of the NOx reducing catalyst. Ammonia is generated by hydrolysis of urea added to the exhaust by the supply device, and supplied to the NOx reducing catalyst as a reducing agent. Meanwhile, ammonia (slipped ammonia) that has passed through the NOx reducing catalyst without contributing to NOx reduction is oxidized by the ammonia purification catalyst and as a result purified before being emitted into the atmosphere.

To meet regulations for engine exhaust that will become tighter in the future, a particulate filter may be added to the SCR exhaust purification device. The particulate filter collects diesel particulates especially emitted from a diesel engine by exhaust filtration, thereby reducing diesel particulates. However, if the particulate filter is simply disposed in addition to the NOx reducing catalyst (and the ammonia purification catalyst downstream of the NOx reducing catalyst), an increase in size of a system as a whole is inevitable, causing problems such as a difficulty in vehicle installation and an excessive weight increase.

In view of this problem, a structure in which the NOx reducing catalyst is supported by the particulate filter so that the particulate filter has both a function of collecting particulates and a function of reducing NOx is studied. As such a catalyst supporting particulate filter, Japanese Laid-Open Patent Application Publication No. 2006-183507 discloses, in FIG. 2, a wall-flow particulate filter in which a urea hydrolysis catalyst is supported on an entire inner wall of a filter medium forming an inlet-side cell passage, while a NOx reducing catalyst is supported on an entire inner wall of the filter medium forming an outlet-side cell passage.

SUMMARY OF THE INVENTION

In the exhaust purification device disclosed in Patent Document 1, however, the filter medium itself needs to have a large capacity in order to ensure particulate collection ability as a particulate filter, and also an ammonia purification catalyst is necessary to be provided in addition to this catalyst supporting particulate filter. Hence, problems such as increases in size and weight of a system as a whole still remain.

The present invention provides an engine exhaust purification device that addresses the problems stated above. An engine exhaust purification device in one aspect of the present invention includes an exhaust filter which has a partition wall capable of filtering particulates from exhaust of an engine and an internal space of which is partitioned by the partition wall into a plurality of cell passages extending along the flow of the exhaust. The exhaust filter includes an inlet-side passage and an outlet-side passage formed by alternately blocking adjacent ones of the cell passages on an inlet side or an outlet side by closing members. In the exhaust filter, a urea hydrolysis catalyst is supported on a first portion of an inner wall of the inlet-side passage, and a first NOx reducing catalyst is supported on a second portion of the inner wall of the inlet-side passage downstream of the first portion. Moreover, a second NOx reducing catalyst is supported on a third portion of an inner wall of the outlet-side passage adjacent to the inlet-side passage with the partition wall interposed therebetween where the third portion overlaps with the first portion in a direction of intersection with the flow of the exhaust into the exhaust filter or is downstream of the first portion, and an oxidation catalyst is supported on a fourth portion of the inner wall of the outlet-side passage downstream of the third portion where the fourth portion overlaps with the second portion in the direction of intersection or is downstream of the second portion.

In the aspect mentioned above, urea is hydrolyzed by the urea hydrolysis catalyst supported on the first portion of the inner wall of the inlet-side passage, and ammonia generated as a result is supplied to the first and second NOx reducing catalysts. This enables efficient NOx reduction.

In detail, the first and second NOx reducing catalysts are respectively supported on the portion (second portion) of the inner wall of the inlet-side passage downstream of the first portion and the portion (third portion) of the inner wall of the outlet-side passage. Here, the third portion is a portion that overlaps with the first portion in the direction of intersection with the flow of the exhaust into the exhaust filter, or is downstream of the first portion. This being so, ammonia that passes through the partition wall from the first portion can be supplied to the second NOx reducing catalyst whilst remaining ammonia can be supplied to the first NOx reducing catalyst, thereby both contributing to NOx reduction. Moreover, slipped ammonia is oxidized by the oxidation catalyst supported on the portion (fourth portion) of the inner wall of the outlet-side passage downstream of the third portion, so that emission of unpurified ammonia into the atmosphere can be prevented.

Thus, a series of chemical reactions relating to selective catalytic reduction by urea, including urea hydrolysis, NOx reduction, and slipped ammonia oxidation, can be performed within the exhaust filter. Therefore, it is possible to suppress emission of NOx and particulates into the atmosphere by a compact structure of a system as a whole, while ensuring an intended NOx conversion rate.

Other objects and features of the present invention can be understood from the following description with reference to attached drawings.

DETAILED DESCRIPTION OF THE PREFERRED EMBODIMENTS

The following describes embodiments of the present invention with reference to drawings.

Figure 1:
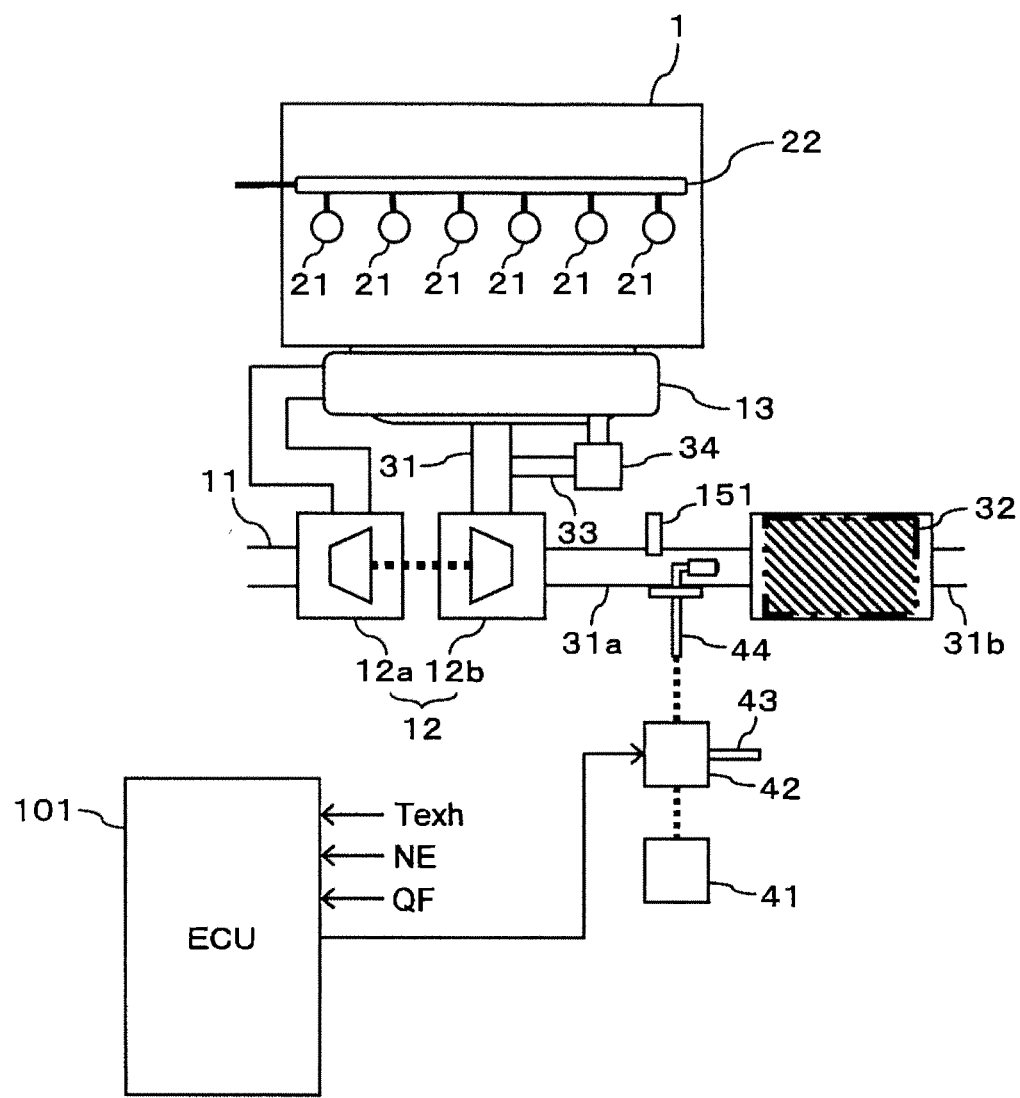
FIG. 1 illustrates a structure of a diesel engine with an exhaust purification device according to an embodiment of the present invention.

FIG. 1 illustrates an overall structure of an engine (hereafter referred to as "engine") 1 with an exhaust purification device according to an embodiment of the present invention. In this embodiment, a direct-injection diesel engine is employed as the engine 1.

An air cleaner (not illustrated) for removing dust in intake air is attached to a portion of introduction into an intake passage 11. In addition, a compressor 12a of a variable-nozzle turbocharger 12 is placed in the intake passage 11. Intake air compressed by the compressor 12a flows into a manifold portion of the intake passage 11 via a surge tank 13, and is distributed to cylinders.

Injectors 21, 21 . . . for fuel supply are arranged in a cylinder head of an engine body, each for a different cylinder. Each injector 21 operates according to a fuel injection control signal from a control unit (hereafter referred to as "ECU") 101 of the engine 1. Fuel delivered from a fuel pump (not illustrated) is supplied to each injector 21 via a common rail 22, and injected into a combustion chamber of each cylinder.

A turbine 12b of the turbocharger 12 is placed in an exhaust passage 31, downstream of a manifold portion. When the turbine 12b is driven by exhaust, the compressor 12a rotates.

A diesel particulate filter (hereafter referred to as "DPF") 32 as an "exhaust filter" according to this embodiment is installed downstream of the turbine 12b. In this embodiment, the DPF 32 has a cylindrical filter medium 321, and is contained in a housing. The filter medium 321 has a honeycomb configuration, and supports a catalyst (NOx reducing catalyst) for promoting a reduction reaction of NOx by ammonia. When the exhaust of the engine 1 passes through the DPF 32, particulates in the exhaust are collected by the filter medium 321, and also NOx in the exhaust is reduced by the NOx reducing catalyst.

Moreover, the exhaust passage 31 is connected to the intake passage 11 (the surge tank 13 in this embodiment) by an EGR pipe 33. The exhaust flows back to the intake passage 11 via the EGR pipe 33. An EGR valve 34 is placed in the EGR pipe 33, to control a flow rate of the exhaust which flows back.

The following describes a structure and an exhaust purification process of the exhaust purification device according to this embodiment, with reference to FIG. 1.

The exhaust purification device according to this embodiment collects particulates in the exhaust by the filter medium 321 of the DPF 32, and also reduces and purifies NOx in the exhaust by the NOx reducing catalyst supported by the filter medium 321. A urea water tank 41 is provided, and ammonia as a reducing agent is stored in the urea water tank 41 in a state of urea water solution. A urea water addition unit 42 is supplied with urea water stored in the urea water tank 41, via a urea water supply pipe. In this embodiment, the urea water addition unit 42 and a urea water spray nozzle 44 in the following constitute an air-assist injector, with an electric feed pump being included in the urea water addition unit 42. Urea water supplied to the urea water addition unit 42 is mixed with compressed air supplied from an air tank (not illustrated) via an air supply pipe 43, and sprayed into the exhaust from the urea water spray nozzle 44. Urea in the sprayed urea water is hydrolyzed by exhaust heat, to generate ammonia. The urea water spray nozzle 44 is situated upstream of the DPF 32 so as to penetrate a pipe wall of the exhaust passage 31 inwardly. Though not particularly limited, a spray direction of the urea water spray nozzle 44 is set toward an upstream end surface (32a) of the DPF 32, in parallel with exhaust flow. In this embodiment, the urea water addition unit 42 and the urea water spray nozzle 44 constitute a "supply device" of urea water.

Figure 4:
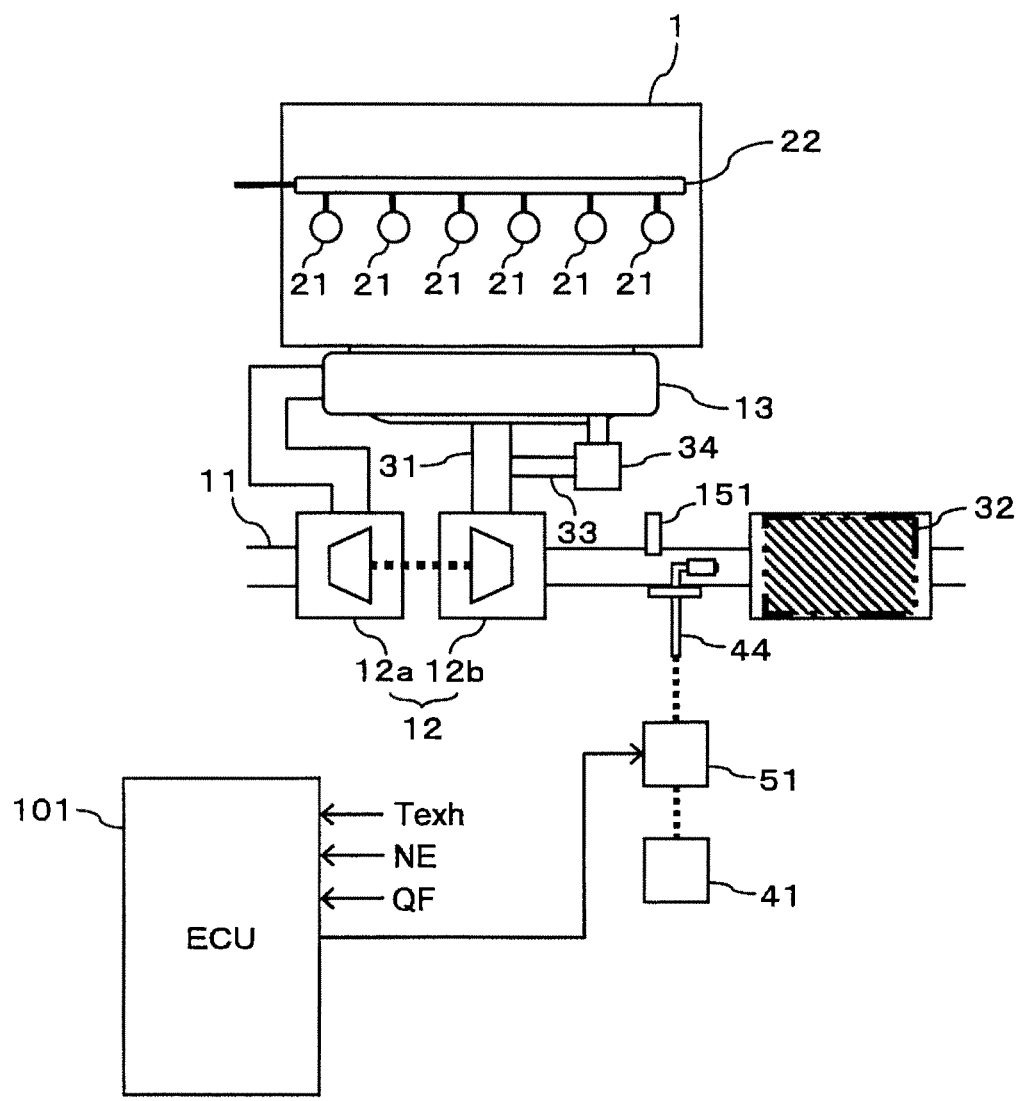
FIG. 4 illustrates a structure of a diesel engine with an exhaust purification device according to another embodiment of the present invention.

Note that the addition of the urea is not limited to be performed by the air-assist type described here. As illustrated in FIG. 4, a booster pump 51 for spray pressure formation may be provided instead of the urea water addition unit 42 (and the air supply pipe 43) so that urea water increased to a predetermined pressure by the booster pump 51 is sprayed from the urea water spray nozzle 44. In such an embodiment, the booster pump 51 and the urea water spray nozzle 44 constitute a "supply device" of urea water.

Figure 2:
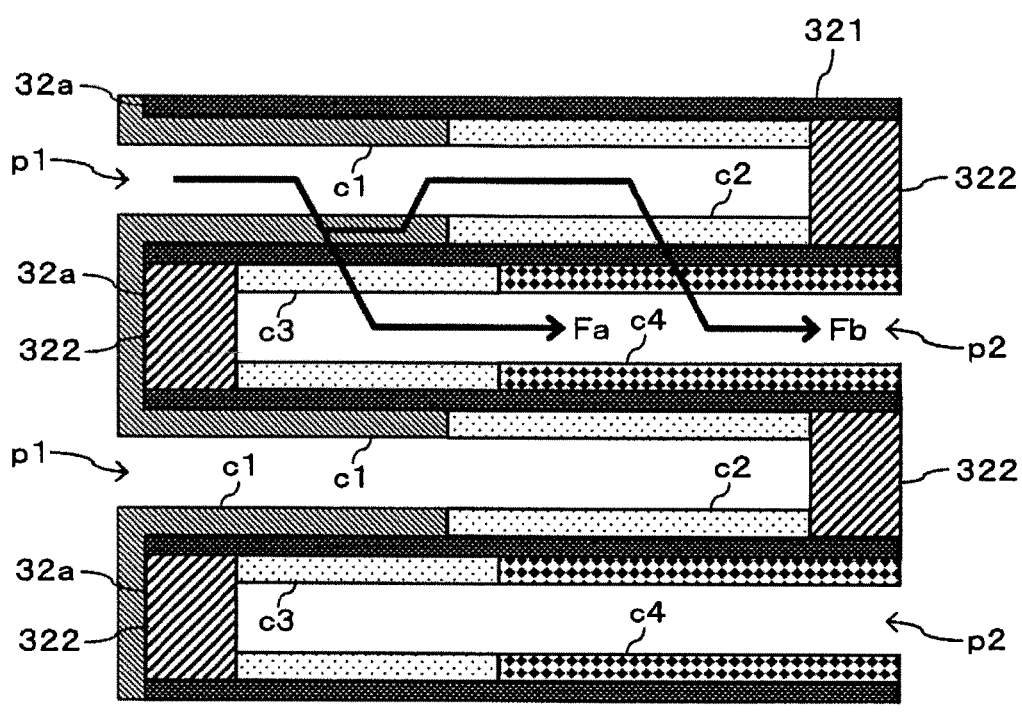
FIG. 2 is a longitudinal section view of a diesel particulate filter included in the exhaust purification device according to the embodiment.

FIG. 2 illustrates a structure of the DPF 32 in a longitudinal section including a central axis of the filter medium 321.

In this embodiment, the DPF 32 has both a function of collecting particulates and a function of reducing NOx. The filter medium 321 is a wall-flow honeycomb support, and the inside of the filter medium 321 is partitioned into a plurality of cell passages p1 and p2 extending along exhaust flow, by each partition wall having fine pores of a size that allows particulates to be collected. These fine pores form passages when the exhaust passes through the partition wall of the filter medium 321. Adjacent cell passages p1 and p2 are alternately blocked on the outlet side or the inlet side by closing members 322, 322 . . . , to form a cell passage (hereafter referred to as "inlet-side passage") p1 which is open on the inlet side and a cell passage (hereafter referred to as "outlet-side passage") p2 which is open on the outlet side. The inlet-side passage p1 is communicated with an exhaust passage 31a upstream of the DPF 32, whereas the outlet-side passage p2 is communicated with an exhaust passage 31b downstream of the DPF 32.

The filter medium 321 supports a plurality of catalysts c1 to c4 of different functions, along exhaust flow inside the filter medium 321. In detail, out of inner wall portions of the filter medium 321 forming the inlet-side passage p1, a portion (corresponding to "first portion") forming an upstream part of the inlet-side passage p1 supports the urea hydrolysis catalyst c1, and a portion (corresponding to "second portion") downstream of this inlet-side inner wall portion supports the NOx reducing catalyst c2. In this embodiment, the first portion supporting the urea hydrolysis catalyst c1 and the second portion supporting the NOx reducing catalyst (corresponding to "first NOx reducing catalyst") are continuously set in a direction of the above-mentioned central axis. Moreover, out of inner wall portions of the filter medium 321 forming the outlet-side passage p2, a portion (corresponding to "third portion") forming an upstream part of the outlet-side passage p2 supports the NOx reducing catalyst c3, and a portion (corresponding to "fourth portion") downstream of this outlet-side inner wall portion supports the oxidation catalyst c4. In this embodiment, the third portion supporting the NOx reducing catalyst (corresponding to "second NOx reducing catalyst") c3 and the fourth portion supporting the oxidation catalyst c4 are continuously set in the direction of the above-mentioned central axis. A downstream end of the third portion is set more downstream than a downstream end of the first portion, and a downstream end of the fourth portion is set more downstream than a downstream end of the second portion. Note that the oxidation catalyst c4 is used for purifying slipped ammonia that has passed through the NOx reducing catalysts c2 and c3 without contributing to NOx reduction, and corresponds to "first oxidation catalyst".

Figure 3:
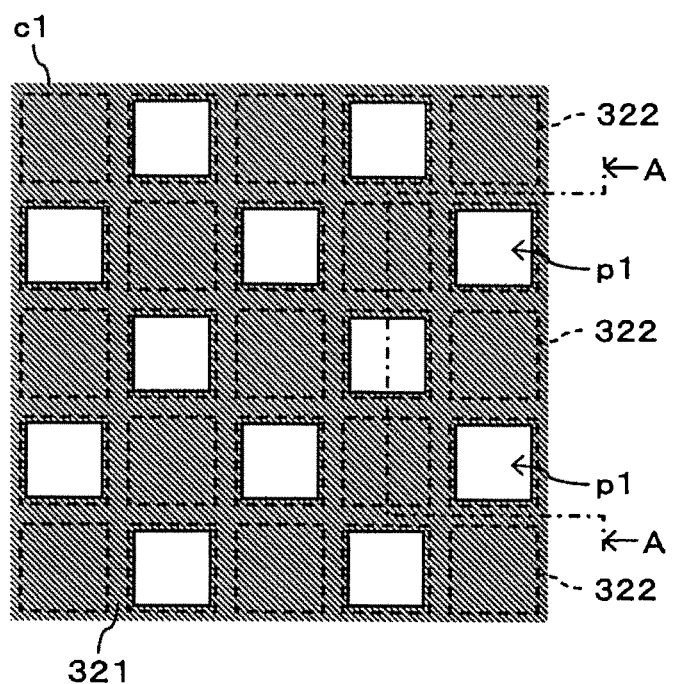
FIG. 3 is an enlarged front view of the diesel particulate filter.

Furthermore, in this embodiment, the urea hydrolysis catalyst c1 is supported not only on the inner wall portion on the inlet side, but also on the end surface 32a of the exhaust filter 32 on the inlet side. FIG. 3 illustrates the DPF 32 as viewed from the exhaust flow upstream side. Thus, in this embodiment, the urea hydrolysis catalyst c1 is supported on the entire end surface 32a of the exhaust filter 32 formed by the upstream closing member 322 and the partition wall of the filter medium 321.

Referencing back to FIG. 1, the operation of the urea water addition unit 42 is controlled by an instruction signal (urea addition control signal) from the ECU 101 for exhaust purification. The ECU 101 is configured as an electronic control unit including a microcomputer. Signals, which accord with an engine speed NE and a fuel oil consumption QF, relating to an operation condition of the engine 1 are input to the ECU 101 from an ECU (not illustrated) for engine control, and also a signal is input to the ECU 101 from an exhaust pipe internal temperature sensor 151 for detecting an exhaust temperature Texh upstream of the DPF 32. The ECU 101 calculates an optimal urea water spray amount according to the operation condition of the engine 1 based on the input signals, and outputs a urea addition control signal according to the calculated urea water spray amount to the urea water addition unit 42.

The following describes the exhaust purification process of the exhaust purification device according to this embodiment, with reference to FIG. 2.

During the operation of the engine 1, the amount of urea water according to the operation condition of the engine 1 is supplied to the exhaust by the urea water addition unit 42 and the urea water spray nozzle 44. Urea in this urea water is hydrolyzed over the urea hydrolysis catalyst c1 supported on the inlet-side inner wall portion (first portion), as a result of which ammonia as a reducing agent is generated. In this embodiment, the urea hydrolysis catalyst c1 is supported not only on the inlet-side inner wall portion but also on the entire inlet-side end surface 32a of the DPF 32 easily to be in contact with the exhaust. Accordingly, ammonia is generated not only inside the DPF 32 but also on the end surface 32a. Part of the generated ammonia passes through the partition wall of the filter medium 321 from the inner wall portion supporting the urea hydrolysis catalyst c1, and is supplied to the outlet-side NOx reducing catalyst c3, as indicated by arrow Fa in FIG. 2. Meanwhile, remaining ammonia is supplied to the inlet-side NOx reducing catalyst c2, and passes through the partition wall from the inner wall portion (second portion) supporting the NOx reducing catalyst c2, as indicated by arrow Fb in FIG. 2. The inlet-side NOx reducing catalyst c2 and the outlet-side NOx reducing catalyst c3 promote a reduction reaction of NOx, leading to a reduction in NOx in the exhaust. Slipped ammonia not contributing to the NOx reduction by the NOx reducing catalysts c2 and c3 is purified by the oxidation catalyst c4 supported on the inner wall of the filter medium 321 forming an extreme downstream part of the outlet-side passage p2.

A series of chemical reactions relating to selective catalytic reduction in this embodiment, including urea hydrolysis, NOx reduction, and slipped ammonia oxidation, are represented by the following expressions (1) to (3).

$$(NH_2)_2CO + H_2O \rightarrow 2NH_3 + CO_2 \quad (1)$$

$$NO + NO_2 + 2NH_3 \rightarrow 2N_2 + 3H_2O \quad (2)$$

$$4NH_3 + 3O_2 \rightarrow 2N_2 + 6H_2O \quad (3)$$

According to this embodiment, the following advantageous effects can be achieved.

In this embodiment, in the DPF 32, urea is hydrolyzed by the urea hydrolysis catalyst c1 supported on the inlet-side inner wall portion and the inlet-side end surface 32a of the filter medium 321, and ammonia generated as a result is supplied to the NOx reducing catalysts c1 and c2 respectively supported on the inlet-side and outlet-side inner wall portions, thereby reducing NOx.

In detail, in this embodiment, the NOx reducing catalysts c2 and c3 are respectively supported on the inner wall portion (second portion) downstream of the inner wall portion of the filter medium 321 supporting the urea hydrolysis catalyst c1 and on the outlet-side inner wall portion (third portion). Here, the outlet-side NOx reducing catalyst c3 is supported on the portion that overlaps with the inner wall portion supporting the urea hydrolysis catalyst c1 in a direction of intersection with exhaust flow into the exhaust filter 32 (in this embodiment, a radial direction perpendicular to the direction of the central axis) and that extends to the downstream of the inner wall portion supporting the urea hydrolysis catalyst c1. This being so, ammonia that passes through the partition wall of the filter medium 321 from the inner wall portion supporting the urea hydrolysis catalyst c1 can be supplied to the outlet-side NOx reducing catalyst c3 whilst remaining ammonia can be supplied to the inlet-side NOx reducing catalyst c2, thereby both contributing to NOx reduction. Moreover, in this embodiment, slipped ammonia is oxidized by the oxidation catalyst c4 supported on the inner wall of the filter medium 321 forming the extreme downstream part of the outlet-side passage p2, so that emission of unpurified ammonia into the atmosphere can be prevented.

Thus, according to this embodiment, the urea hydrolysis catalyst c1, the inlet-side and outlet-side NOx reducing catalysts c2 and c3, and the oxidation catalyst c4 for slipped ammonia purification are arranged within the DPF 32 in order of the series of chemical reactions relating to selective catalytic reduction by urea. This enables purification of NOx in the exhaust, including slipped ammonia treatment, to be efficiently performed within the filter. In addition, according to this embodiment, not only NOx can be reduced, but also particulates in the exhaust can be collected and removed by the filter medium 321. Therefore, emission of NOx and particulates into the atmosphere can be suppressed by a compact structure of a system as a whole.

Furthermore, in this embodiment, the urea hydrolysis catalyst c1 is supported not only on the inlet-side inner wall portion but also on the inlet-side end surface 32a of the DPF 32. The inlet-side end surface 32a faces exhaust flow, and so is easily to be in contact with the exhaust. Since ammonia generation can be supplemented by the urea hydrolysis catalyst c1 supported on the end surface 32a, it is possible to decrease the urea hydrolysis catalyst c1 supported on the inner wall of the filter medium 321 to thereby secure an inlet-side inner wall portion for supporting the NOx reducing catalyst c2. By enabling the NOx reducing catalyst c2 to be supported on the inlet-side inner wall portion, the NOx reducing catalyst c3 supported on the outlet-side inner wall portion can be decreased. Hence, a sufficient space for supporting the oxidation catalyst c4 for slipped ammonia purification can be secured in the single DPF 32.

Figure 5:
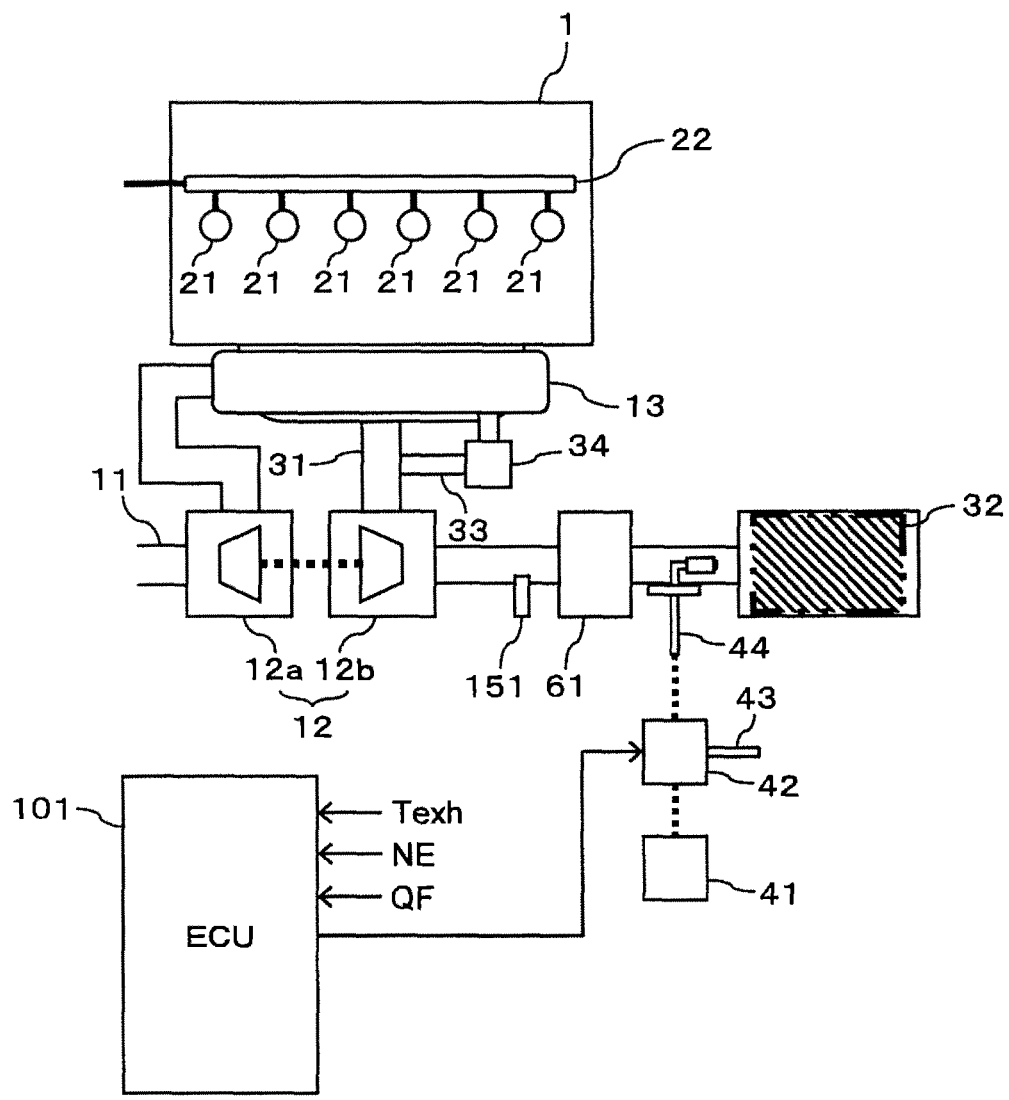
FIG. 5 illustrates a structure of a diesel engine with an exhaust purification device according to yet another embodiment of the present invention.

Note that, in addition to the above-mentioned structure, an oxidation catalyst 61 as "second oxidation catalyst" may be provided upstream of the DPF 32, as illustrated in FIG. 5. The oxidation catalyst 61 is used for oxidizing hydrocarbons and carbon monoxide in the exhaust, and also converting nitrogen monoxide in the exhaust into NOx mainly composed of nitrogen dioxide (hereafter referred to as "$NO_2$") so as to adjust a ratio of NO and $NO_2$ in the exhaust optimally for a reduction reaction of NOx.

The present invention is applicable not only to direct-injection diesel engines, but also to diesel engines of other types such as indirect-injection type and gasoline engines.

Though the present invention has been described above by way of preferred embodiments, the scope of the present invention is not limited to the above description, but determined based on the claims in accordance with applicable provisions.

What is claimed is:

1. An engine exhaust purification device comprising an exhaust filter which has a partition wall capable of filtering particulates from exhaust of an engine and an internal space of which is partitioned by the partition wall into a plurality of cell passages extending along the flow of the exhaust, adjacent ones of the cell passages being alternately blocked on an inlet side or an outlet side by closing members to form an inlet-side passage and an outlet-side passage, the inlet-side passage being a cell passage which is open on the inlet side, and the outlet-side passage being a cell passage which is open on the outlet side, wherein the exhaust filter comprises:

a urea hydrolysis catalyst supported on a first portion of an inner wall of the inlet-side passage;

a first NOx reducing catalyst supported on a second portion of the inner wall of the inlet-side passage downstream of the first portion;

a second NOx reducing catalyst supported on a third portion of an inner wall of the outlet-side passage adjacent to the inlet-side passage with the partition wall interposed therebetween, the third portion overlapping with the first portion in a direction of intersection with the flow of the exhaust into the exhaust filter; and a first oxidation catalyst supported on a fourth portion of the inner wall of the outlet-side passage downstream of the third portion, the fourth portion overlapping with the second portion in the direction of intersection.

2. The engine exhaust purification device according to claim 1, wherein the first portion includes therein an inlet-side edge of the inner wall of the inlet-side passage.

3. The engine exhaust purification device according to claim 1, wherein the urea hydrolysis catalyst is supported not only on the first portion hut also on an inlet-side end surface of the exhaust filter formed by the closing member.

4. The engine exhaust purification device according to claim 1 further comprising a urea water supply device arranged to supply urea water to engine exhaust upstream of the exhaust filter.

5. The engine exhaust purification device according to claim 4 further comprising a second oxidation catalyst provided upstream of the exhaust filter.

* * * * *